United States Patent [19]

Hong

[11] Patent Number: 5,281,117

[45] Date of Patent: Jan. 25, 1994

[54] MOLDING MECHANISM

[76] Inventor: Kuo-Fui Hong, P.O. Box 1032, Tainan, Taiwan

[21] Appl. No.: 896,652

[22] Filed: Jun. 10, 1992

[51] Int. Cl.⁵ .............................................. B28B 7/02
[52] U.S. Cl. ........................................ 425/2; 249/55; 249/82; 249/155; 249/156; 425/175
[58] Field of Search ............... 425/2, 175, 330, 192 R; 249/55, 82, 155, 156, 159; 264/219

[56] References Cited

U.S. PATENT DOCUMENTS

| | | | |
|---|---|---|---|
| 221,569 | 11/1879 | Johnson | 425/2 |
| 612,504 | 10/1898 | Oliver | 425/175 |
| 2,043,503 | 6/1936 | Aschenborn | 425/2 |
| 2,410,888 | 11/1946 | Lucy | 249/155 X |
| 3,479,691 | 11/1969 | Durland | 425/2 |
| 3,596,869 | 8/1971 | Humphrey | 249/155 |
| 4,470,782 | 9/1984 | Zimmerman, Jr. et al. | 425/2 |
| 5,192,560 | 3/1993 | Umetsu et al. | 249/155 X |

Primary Examiner—Richard L. Chiesa

[57] ABSTRACT

A molding mechanism including one pair of molding devices oppositely disposed in a body and each having a casing, and a number of pin elements arranged in matrix form in the casing, a board engaged in one side of the casing, and a bolt threaded through the casing for forcing the board toward the pin elements in order to fix the pin elements in place, whereby, a mold cavity is formed among the pin elements when the molding devices are moved toward an object disposed between the molding devices.

7 Claims, 5 Drawing Sheets

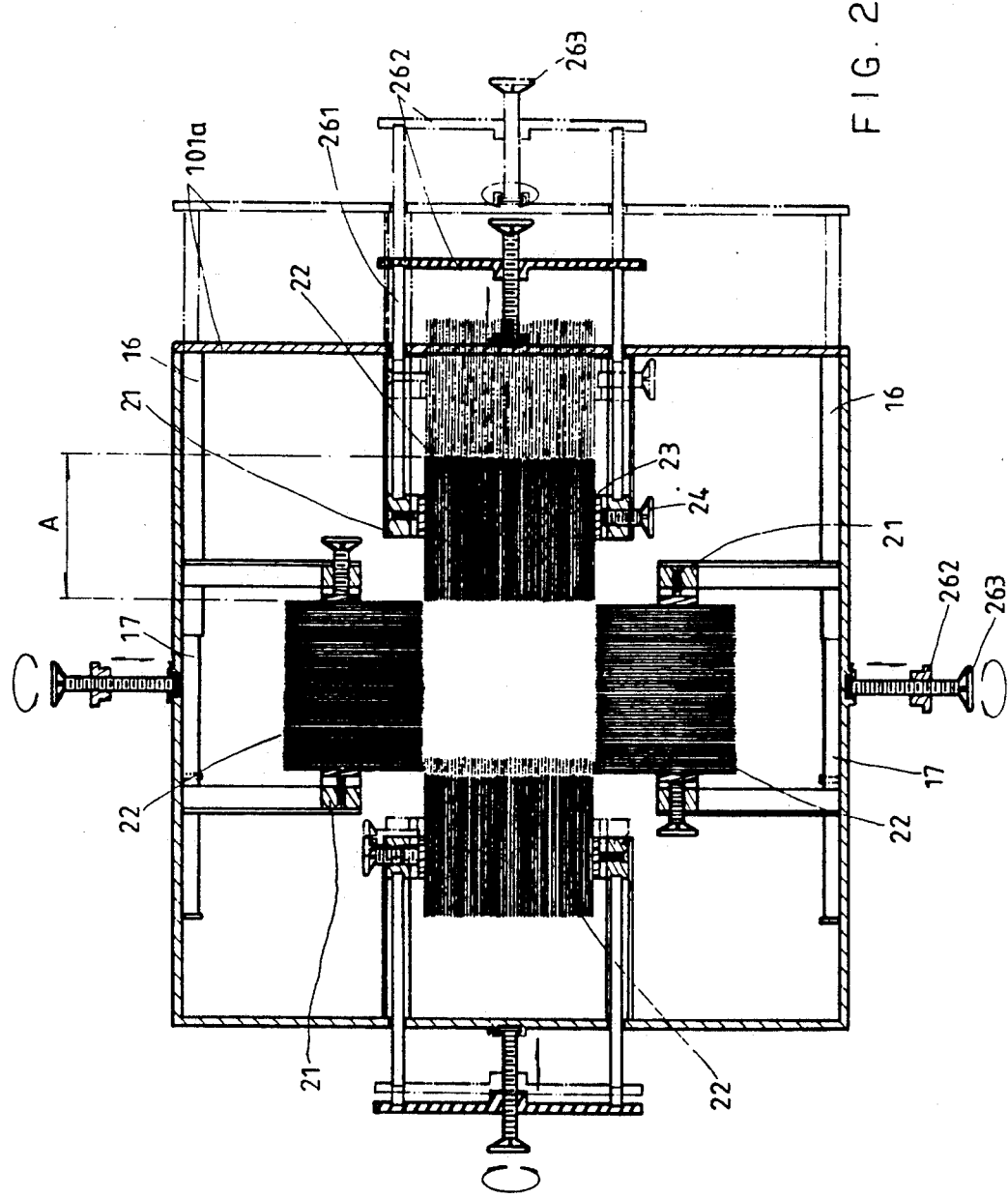

MOLDING MECHANISM

BACKGROUND OF THE INVENTION (a) Field of the Invention

The present invention relates to a mechanism, and more particularly to a molding mechanism.

(b) Description of the Prior Art

Typically, in order to make a wax image, plaster materials are applied onto an object, such as a head of a person and removed after that plaster materials are cured, however, it usually takes more than 40 minutes to wait until the plaster materials are cured, the model may feel uncomfortable.

For forming a plaster mold or a gypsum mold, gypsum materials are applied onto an object to be molded, the mold is suitable for making an object of definite size and definite shape.

The present invention has arisen to mitigate and/or obviate the afore-described disadvantages of the conventional molding problems.

SUMMARY OF THE INVENTION

The primary objective of the present invention is to provide a molding mechanism in which the gypsum mold can be easily formed.

In accordance with one aspect of the present invention, there is provided a molding mechanism comprising a body, and at least one pair of molding means oppositely disposed in the body and movable toward each other, each of the molding means including a casing having four sides, and a plurality of pin elements arranged in matrix form in the casing, a board engaged in a first side of the four sides of each of the casing, and a first bolt threaded through the first side of the casing for forcing the board toward pin elements in order to fix the pin elements in place, whereby, a mold cavity is formed among the pin elements when the molding means are moved toward an object disposed between the molding means.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a side schematic view of the molding mechanism;

DETAILED DESCRIPTION OF THE PREFERRED EMBODIMENTS

Figure 1:
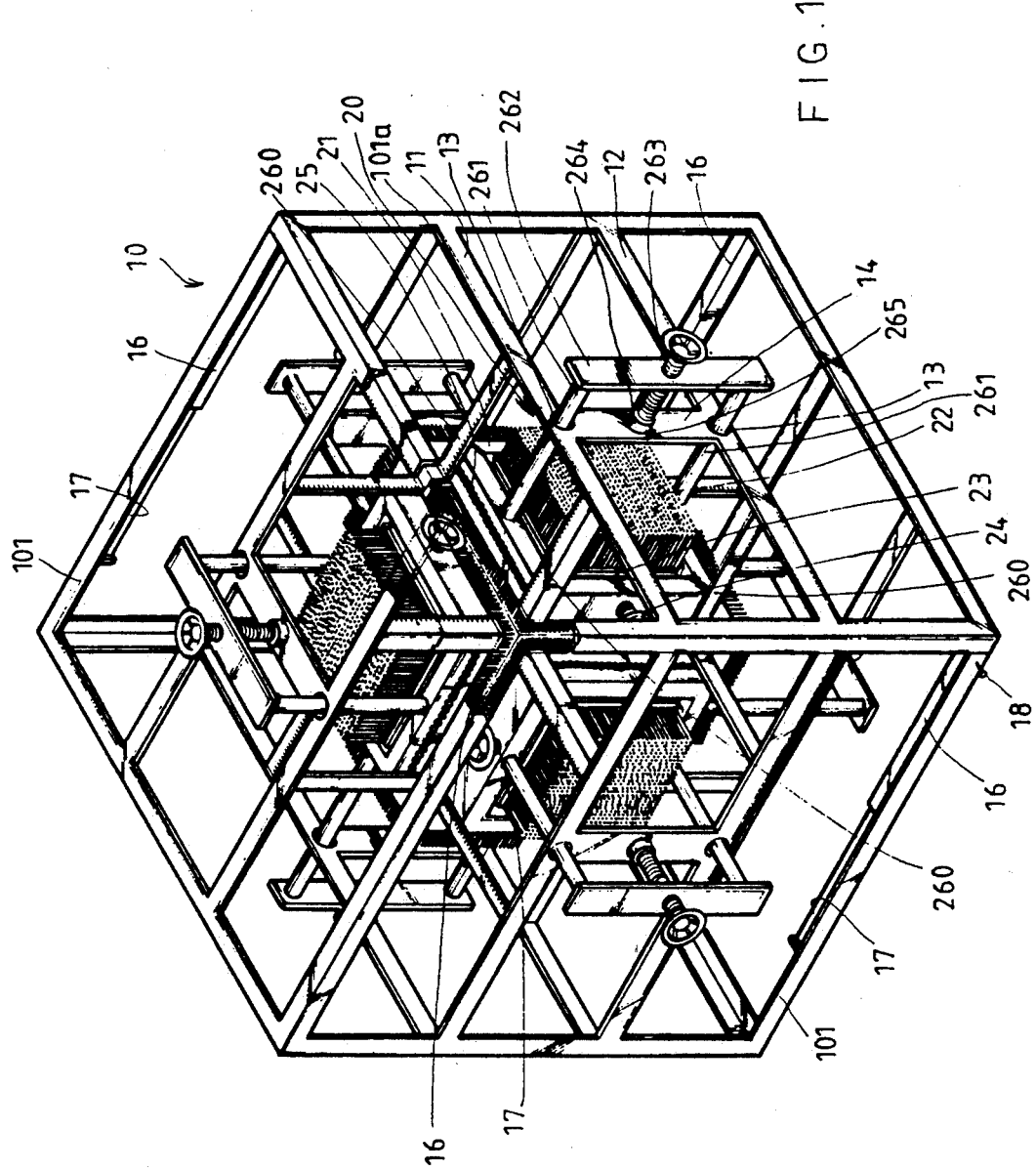
FIG. 1 is a perspective view of a molding mechanism in accordance with the present invention.

Referring to the drawings and initially to FIGS. 1 and 2, a molding mechanism in accordance with the present invention comprises generally a cubic body 10 including six square surfaces each formed by a square frame 101, 101a, in which five of the surfaces are formed integral by five square frames 101, and the other one of the surfaces is formed by another square frame 101a which is slidable inwards and outwards of the body 10. Four ducts 16 are formed in the four corner areas of the body 10 corresponding to the corner areas of the frame 101a, and a rod 17 is formed integral on each of the corner areas of the frame 101a and extended inwards of the body 10 for slidable engagement with the respective ducts 16, such that the frame 101a is movable inwards and outwards of the body 10. A bolt 18 is threadedly engaged beside each of the ducts 16 for fixing the rods 17 in place.

Each of the frames 101, 101a includes a pair of bars 11, 12 laterally formed therein with a stripe 14 formed integral between the middle portions of the bars 11, 12, and each of the bars 11, 12 includes an opening 13 formed in the middle portion thereof. A pair of posts 261 extend through the respective openings 13 of the bars 11, 12 of each of the frames 101, 101a, in which one of the ends of the posts 261 are coupled together by a plate 262 and a molding means 20 is supported between the other ends of the posts 261. A bolt 263 is threadedly engaged through each of the plates 262 and includes one end rotatably supported in a hub 264 which is formed integral on each of the stripes 14, a screw 265 is threadedly engaged in each of the hubs 264 for fixing the bolts 263 in place and for preventing the bolts 263 from rotating movements; accordingly, the molding means 20 can be caused to move either inwards or outwards of the body 10 by the threaded engagement between the plates 262 and the bolts 263. Four channels 260 extend inwards of the body 10 from the bars 11, 12 for slidably supporting the molding means 20 and for guiding the sliding movement of the molding means 20.

Figure 3:
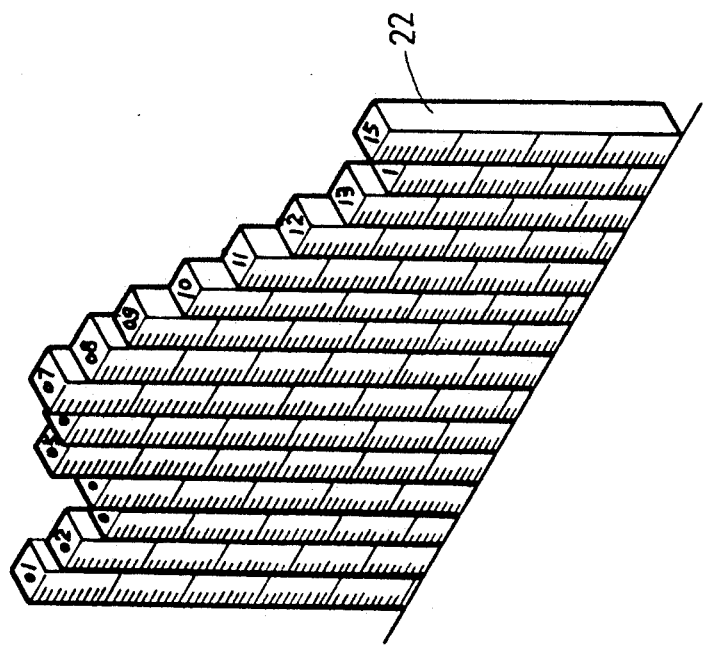
FIG. 3 is a perspective view of the pin elements.

Referring next to FIGS. 3 and 4, and again to FIGS. 1 and 2, each of the molding means 20 includes a casing 21 which is preferably square including four sides, and a plurality of pin elements 22 arranged in parallel in the casing 21. The pin elements 22 are preferably square in cross section such that the pin elements 22 can be arranged in a matrix form, best shown in FIGS. 3 and 4, each of the pin elements 22 are preferably numbered on the end portions thereof, as shown in FIG. 3. A board 23 is disposed in one of the sides of each of the casings 21 and contacts the pin elements 22, a bolt 24 is threadedly engaged in the side of the casing 21 for forcing the board 23 towards the pin elements 22 in order to fix the pin elements 22 in place. A plurality of bolts 25 are threadedly along the upper side of each of the casings 21 for fixing each column of the pin elements 22 in place.

Figure 4:
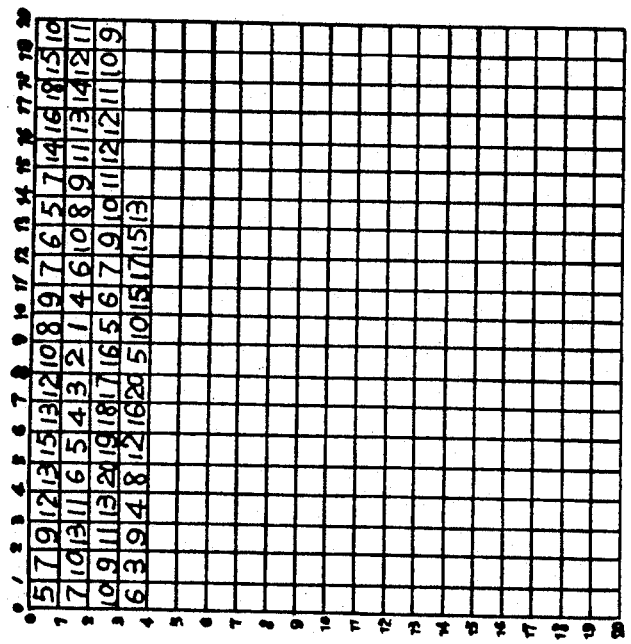
FIG. 4 is a schematic view illustrating the record of the positions of the pin elements.
Figure 5:
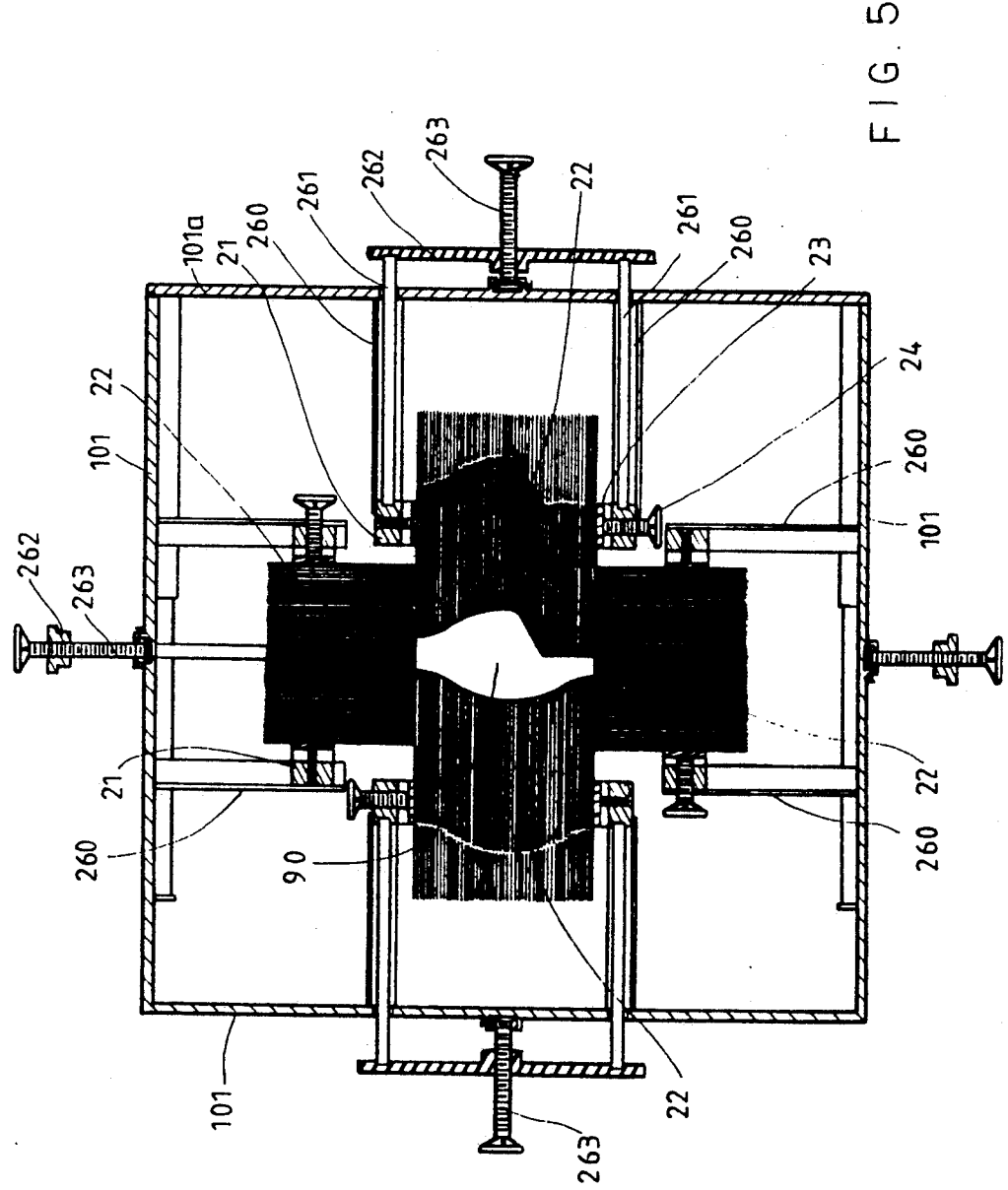
FIG. 5 is a side schematic view similar to FIG. 2, illustrating the operation of the molding mechanism.

In operation, as shown in FIGS. 4 and 5, it is to be noted that the pin elements 22 are not fixed in place by the bolts 24 and 25 before molding operations, such that the pin elements 22 are loosely supported in place, an object 90 to be molded is disposed in the center of the body 10 and disposed among the molding means 20, the molding means 20 are moved toward the object 90, the pin elements 22 are moved and arranged according to the shape of the object 90. The board 23 is forced toward the pin elements 22 for forcing the pin elements 22 in place, and the bolts 25 are threaded toward the pin elements after each column of the pin elements 22 are moved to the suitable positions. The movements of the pin elements 22 relative to a reference plane, such as the casing 21, are preferably recorded in a paper sheet as shown in FIG. 4, such that the relative positions of the pin elements 22 can be determined. The frame 101a is moved outward such that the object 90 can be removed and such that a mold cavity corresponding to the shape of the object 90 can be formed among the molding means 20. Plaster or gypsum materials are then introduced into the mold cavity such that a plaster mold or a gypsum mold can be formed after the materials become hardened.

It is to be noted that the records of the relative positions of the pin elements 22 can be sent to a far distance by such as fax machine and can be used to arrange the pin elements 22 of another molding mechanism, such that the object can also be molded in the far place easily. Furthermore, the records can be enlarged or decreased in proportion to the object, such that a mold with increased ratio or decreased ratio can be formed.

Obviously, the molds can be formed more precisely if the quantity of the pin elements 22 is large enough. In addition, in order to form a mold have a shape resemblant to the object to be formed, a silicon film can be applied to the ends of the pin elements 22 which contact the object, the shape of the object will be transferred to the silicon film.

Figure 8:
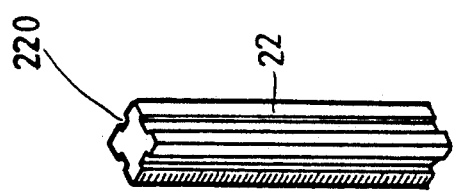
FIGS. 7 and 8 are partial perspective views illustrating two types of the pin elements.
Figure 7:
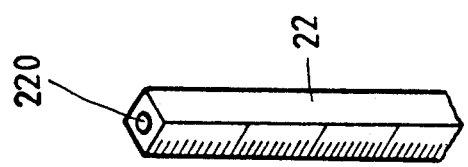
Figure 6:
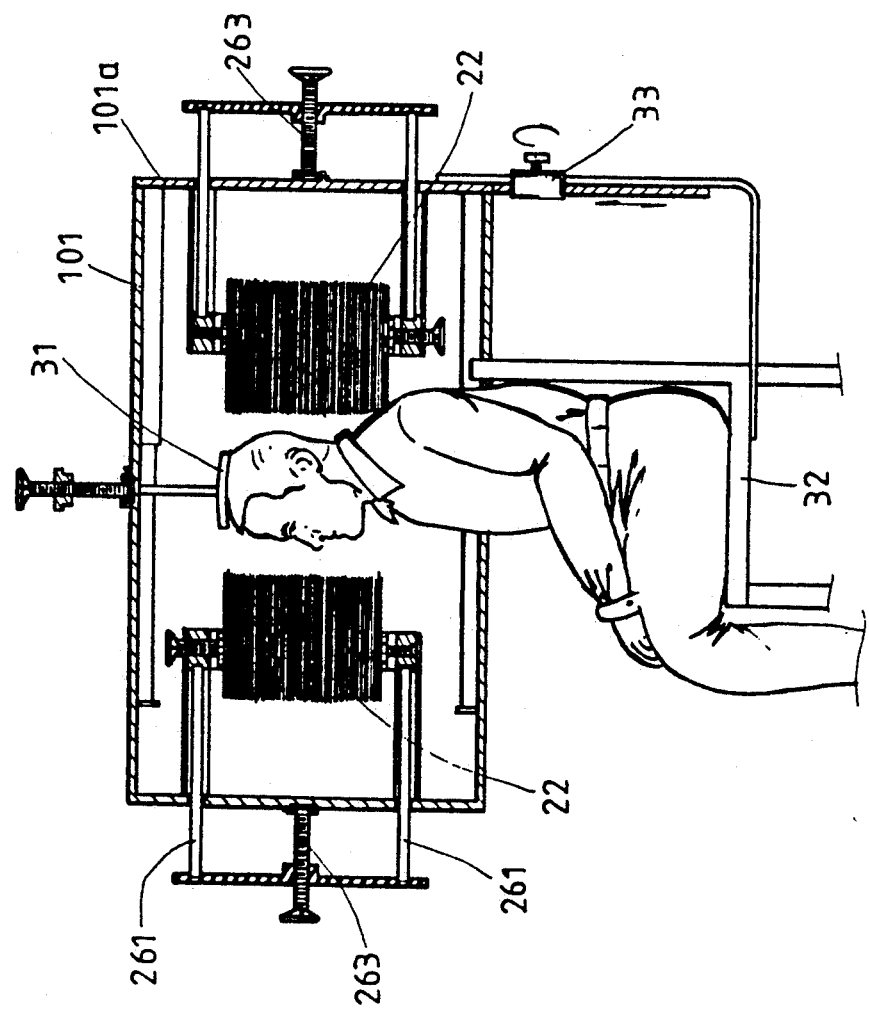
FIG. 6 is a side schematic view illustrating the operation of the molding mechanism.

Referring next to FIGS. 6 to 8, the molding mechanism is also suitable for forming a wax image of a person whose head is disposed among the molding means 20. In order that the person can breathe, the pin element 22 may either include an orifice 220 formed therein, as shown in FIG. 7, or include a slot 221 formed longitudinally along the outer surface of the pin elements 22. The orifices 220 and the slots 221 are closed with such as silicon materials, such that the plaster materials may not flow into the orifices 220 or the slots 221.

It is to be noted that only two of the molding means 20 are good enough for forming a mold, in which the two molding means 20 are disposed oppositely in the body 10, for example, in the body as shown in FIG. 1, there are three pairs of oppositely disposed molding means 20, including front and rear molding means, left and right molding means and up and down molding means. For example, as shown in FIG. 5, without the upper and lower molding means, the upper and the lower portions of the mold cavity formed by the object 90 can be enclosed by a plate, for example, such that the mold cavity can also be formed without the upper and the lower molding means.

Accordingly, gypsum molds can be easily formed, enlarged or diminished with the molding mechanism in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A molding mechanism comprising a body, and at least one pair of molding means oppositely positioned in said body and movable toward each other, each of said molding means including a casing having four sides, and a plurality of pin elements arranged in matrix form in said casing, a board engaged in a first side of said four sides of each of said casings, and a first bolt threaded through said first side of said casing for forcing said board toward said pin elements in order to fix said pin elements in place, said casing including a second side perpendicular to said first side thereof, a plurality of second bolts threadedly engaged in said second side and each arranged in parallel with one column of said pin elements, whereby, a mold cavity is formed among said pin elements when said molding means are moved toward an object positioned between said molding means, each of said columns of said pin elements are fixed in place by a respective second bolt.

2. A molding mechanism comprising a body, and at least one pair of molding means oppositely positioned in said body and movable toward each other, each of said molding means including a casing having four sides, and a plurality of pin elements arranged in matrix form in said casing, a board engaged in a first side of said four sides of each of said casings, and a first bolt threaded through said first side of said casing for forcing said board toward said pin elements in order to fix said pin elements in place, said body including a pair of frames oppositely formed therein, a pair of posts vertically and slidably extended through each of said frames, each of said posts having one end fixed to said casing of said molding means and having the other ends coupled together by a plate, and a second bolt threaded through said plate and having one end rotatably engaged in said frame, whereby, a mold cavity is formed among said pin elements when said molding means are moved toward an object positioned between said molding means, said molding means and said posts are moved toward and away from said frame by threaded engagement between said plate and said second bolt.

3. A molding mechanism comprising a cubic body including four side surfaces each having a frame formed therein, a molding means positioned in each of said frames of said body, each of said molding means including a casing having four sides, and a plurality of pin elements arranged in matrix form in said casing, a pair of posts vertically and slidably extended through each of said frames, each of said posts having one end fixed to said casing of said molding means and having the other ends coupled together by a plate, and a first bolt threaded through said plate and having one end rotatably engaged in said frame, said molding means and said posts being moved toward and away from said frame by threaded engagement between said plate and said second bolt, a board engaged in a first side of said four sides of each of said casings, and a second bolt threaded through said first side of said casing for forcing said board toward said pin elements in order to fix said pin elements in place, whereby, a mold cavity is formed among said pin elements when said molding means are moved toward an object positioned between said molding means.

4. A molding mechanism according to claim 3, wherein said casing includes a second side perpendicular to said first side thereof, a plurality of third bolts are threadedly engaged in said second side and each is arranged in parallel with one column of said pin element, whereby, each of said columns of said pin elements are fixed in place by a respective third bolt.

5. A molding mechanism according to claim 3, wherein a first of said frames includes four corner areas, a rod is extended from each of said corner areas of said first frame and extended inwards of said body, said body includes four ducts formed therein for slidably receiving said rods, whereby, said first frame is movable inwards and outwards of said body by the engagement between said rods and said ducts.

6. A molding mechanism according to claim 3, wherein each of said pin elements includes a square cross section having an orifice longitudinally formed through the center thereof.

7. A molding mechanism according to claim 3, wherein each of said pin elements includes a square cross section having four sides, and a slot is formed longitudinally in at least one of said four sides of each of said pin elements.

* * * * *